INVENTOR.
ANGELO R. DE VITO
BY
ATTORNEYS.

Jan. 5, 1954 A. R. DE VITO 2,665,157
DOOR CONTROL MECHANISM
Filed April 25, 1949 6 Sheets-Sheet 4

INVENTOR.
ANGELO R. DE VITO
BY
*Bosworth & Sessions*
ATTORNEYS

INVENTOR.
ANGELO R. DE VITO
BY
ATTORNEYS.

INVENTOR.
ANGELO R. DeVITO
BY Bosworth & Sessions
ATTORNEYS.

Patented Jan. 5, 1954

2,665,157

UNITED STATES PATENT OFFICE 2,665,157

DOOR CONTROL MECHANISM

Angelo R. de Vito, Cleveland Heights, Ohio, assignor, by mesne assignments, to Rudolph I. Schonitzer, Cleveland, Ohio Application April 25, 1949, Serial No. 89,540

24 Claims. (Cl. 292—216)

This invention relates to door control mechanisms and more particularly to an improved door latching and locking apparatus which is especially suited for use in automotive vehicles.

It will be understood by those skilled in the art that my present invention may be utilized in connection with doors and closures of many different types. However, as the illustrated embodiments are designed for use with the doors of automobile bodies, the following discussion will be directed particularly to this type of installation.

In automobile door control mechanisms it is the usual practice to provide latch unit means for latching the door whereby the door is held closed until the operator suitably manipulates either inside or outside operating means to release the latch and permit opening of the door. Furthermore, means are normally provided for locking the door against unauthorized or undesired opening thereof. The latching and locking means are commonly combined in one apparatus in which locking is effected by preventing unlatching of the door and it is an object of the present invention to provide an improved control mechanism for latching and locking a door whereby locking against unauthorized opening thereof from the outside may readily be effected by the operator upon leaving the vehicle without use of a key but which will not accidentally be actuated in such a manner that the operator will lock himself out.

Other objects of my invention include: the provision of door control means wherein the lock mechanism may be actuated from inside or outside of the door and wherein, when the door is open, the operator by a single distinctive manipulation of a part of the door control apparatus may so operate the lock mechanism that, upon closing the door, it will be in locked condition and may only be opened by use of the proper key; the provision of a novel means for utilizing the outside latch operating member for controlling, under certain conditions, locking of the door; the provision of a door control mechanism in which a single manipulation of a part of the apparatus will enable the door to be locked upon closing same without any other operation by the user, this particular manipulation being adapted only to effect this locking action; the provision of an improved lock mechanism which may readily be incorporated in door control devices of the general type shown in Rudolph I. Schonitzer Patent No. 2,094,413 without increasing the bulk of the mechanism or changing its normal mode of operation; the provision of door control mechanism including lock means which, when the door is closed, may be locked or unlocked at will by manipulation of an inside lock actuating member but which, when the door is open, cannot be set by the inside locking member in a position which will result in the door being locked when closed but which can only be set in such a position by suitable manipulation of the outside latch operating member; and, the provision of a rugged, economically manufactured, and effective lock operating mechanism which can readily be adapted to latch mechanisms of different designs and types.

The above and other objects of my invention will appear from the following description of several embodiments of my improved door control mechanism, reference being had to the accompanying drawings in which.

Figure 1:
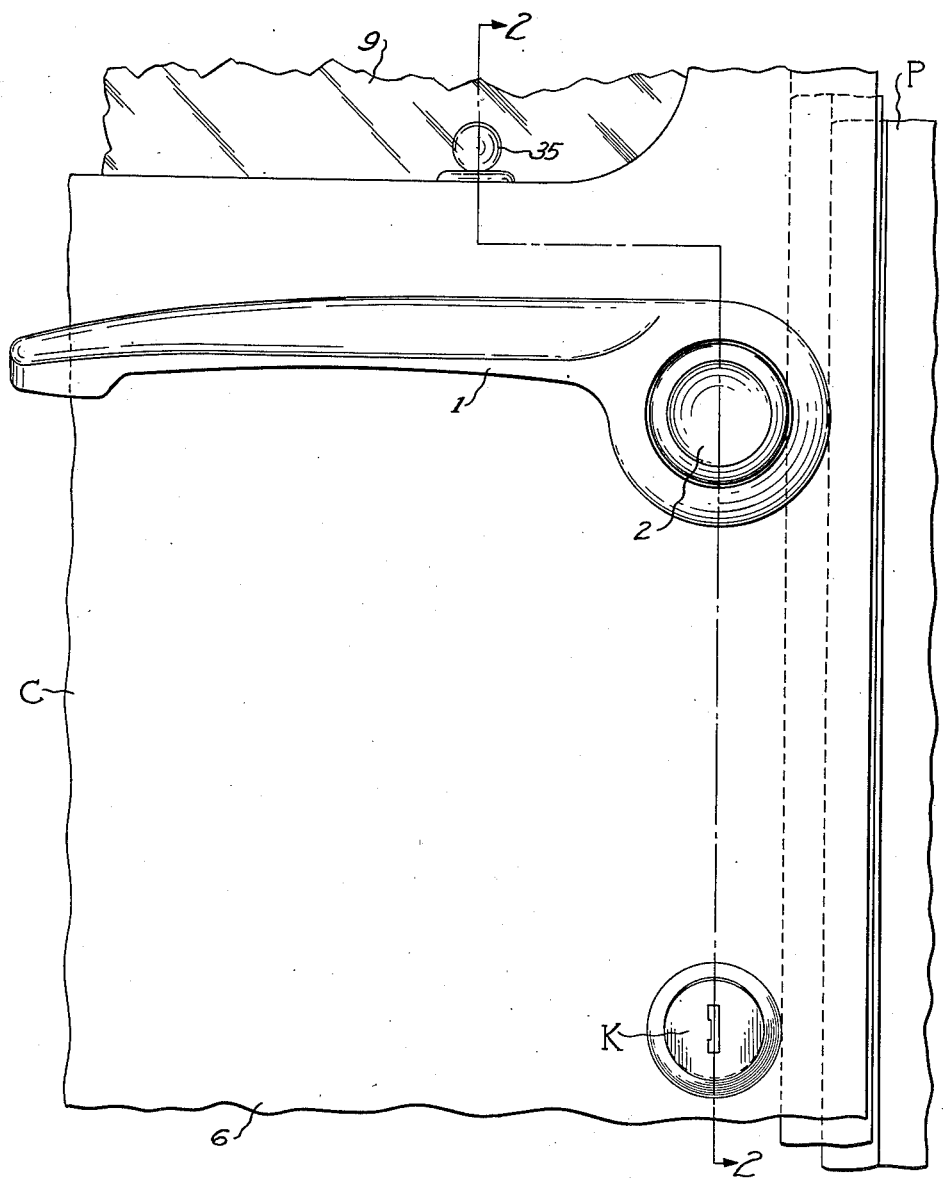
Figure 1 is a fragmentary outside side elevational view of an automobile door in which my improved door control mechanism is installed, the door being shown in closed and locked position.

In general, my invention contemplates a door control mechanism which includes latch means for retaining the door in closed position, lock means for locking the door against unauthorized opening, and an outside operating member, such as a handle or push button, which in its normal operation is manipulated by the operator to release the latch and permit the door to open but which also is so arranged that a particular and distinctive manipulation thereof, when the door is unlatched and open, will actuate the lock mechanism in such a manner that, when the door is closed after such manipulation, it will be locked. This arrangement eliminates the necessity for the operator to use a key to lock the door upon leaving the vehicle. Moreover, it provides an effective means for deterring the operator from inadvertently locking the door with the key inside and thus locking himself out. This protection against accidental lock-out is provided because an unusual and voluntary manipulation on the part of the operator is required to insure that the door will be locked when closed.

In certain prior automobile door latch mechanisms means have been provided whereby, when the door is open, an inside lock operating knob can be pushed down in the usual manner and when the door is thereafter closed it is locked. This arrangement is considered undesirable in some cases, however, as there is the possibility of accidental or inadvertent pushing down of this inside knob because of its location and also because it is the normal locking operation. In other prior automobile door control mechanisms means have been provided whereby two separate manipulations were required to effect locking without use of the key, one the pushing down of the inside lock operating knob and the other the holding of the outside operating handle in normal unlatching position until the door is fully closed and latched. My improved single distinctive manipulation locking means simplifies the keyless locking operation while making it more fool-proof than either of the above referred to prior devices.

Referring now to the drawings, a fragmentary portion of what may be considered to be the left-hand front door of an automobile is indicated at C. The body pillar P carries a keeper member (not shown) which coacts with the latch mechanism mounted within the door C. Handle 1 is fixed to the door and houses at one end an outside operating member which, as illustrated, takes the form of a push button 2 suitably supported in a tubular guide 3 and provided with an operating plunger 4. The spring 5 holds push button 2 in its normal non-operating position, seen in Figure 2, except when pressure is exerted by the operator.

It will be understood that although I have illustrated the outside operating means for the door control mechanism as a push button, a suitable lever, pull handle, turn handle, or other device might be employed to effect outside operation of the door control mechanism and accordingly the push button 2 is to be considered as being merely illustrative of one form of outside operating means.

Figure 2:
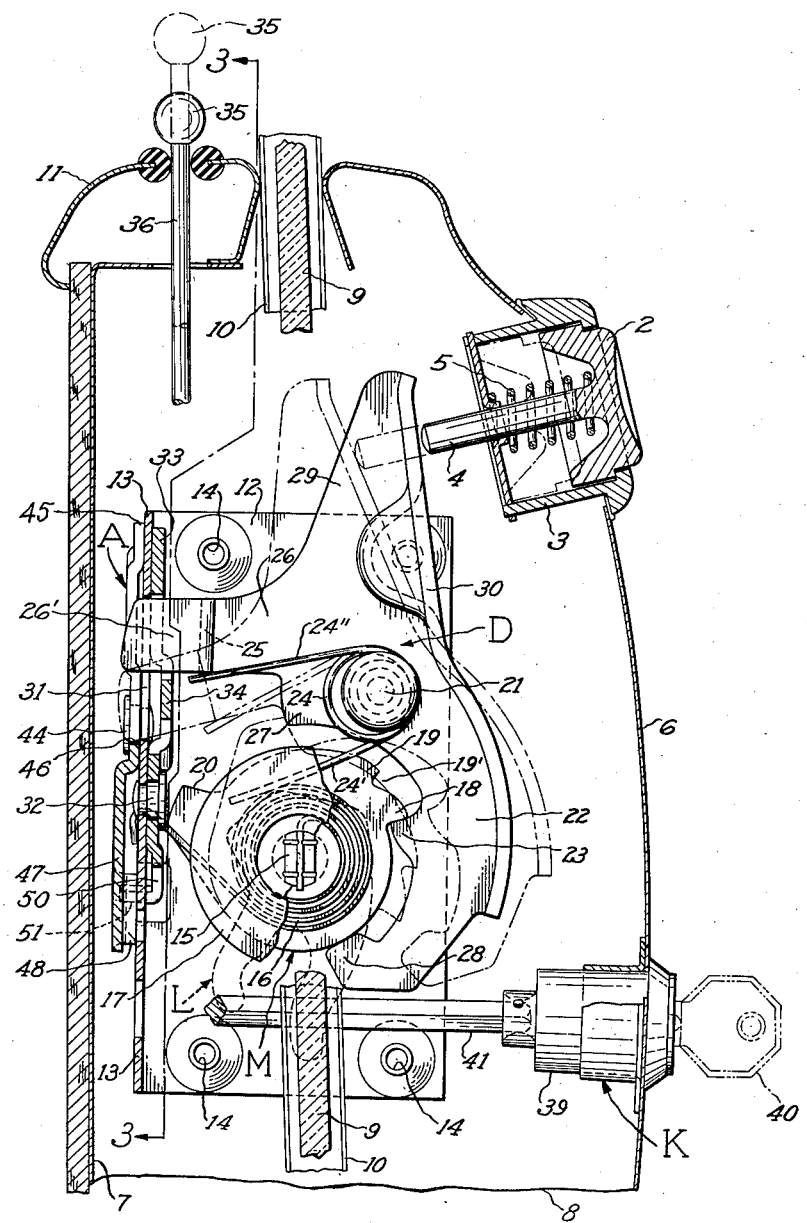
Figure 2 is a vertical cross-sectional view taken substantially on line 2—2 of Figures 1 and 3.

The push button guide or housing 3 is suitably mounted on and extends through the outside panel 6 of door C. The inner door panel 7 and a door free edge wall 8 enclose the latch mechanism in usual manner. In Figure 2 the window glass is seen at 9 suitably supported in a glass-run channel 10 and the inside garnish molding is indicated at 11.

Figure 3:
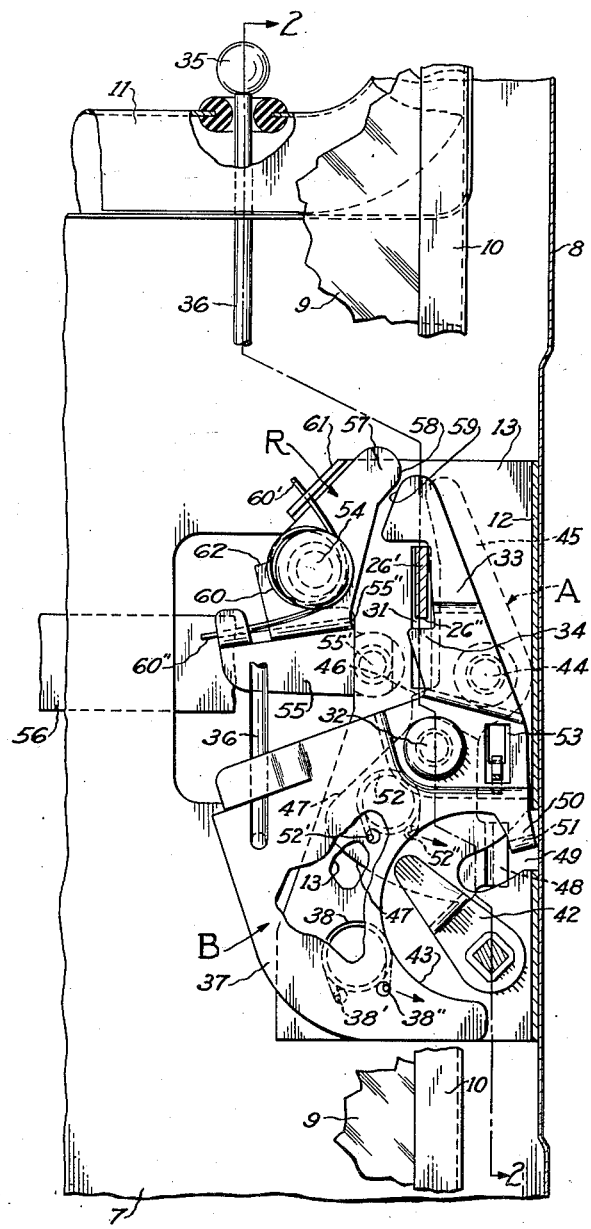
Figure 3 is a vertical cross-sectional view taken substantially on line 3—3 of Figure 2.

As is clearly seen in Figures 2 and 3 my latch mechanism includes a frame structure having a base plate portion 12 and a side flange portion 13. Supporting screws extend through the free edge wall 8 into the threaded holes 14 (Figure 2) to secure the latch frame structure firmly in position on the door. A bifurcated latch member L is secured on a latch shaft 15, the flattened end of which is seen in Figure 2, and which is rotatably supported by a suitable bearing (not shown) carried by base plate 12. Shaft 15 extends through an aperture (also not shown) in the edge wall 8 of the door and the latch member L is mounted at its outer end on the outer side of edge wall 8 in position to coact with a keeper pin (not shown) mounted on the adjacent door frame in a well known manner and as is fully described in the Rudolph I. Schonitzer Patent No. 2,094,413 and in the Edwin L. Allen copending United States patent application Serial No. 746,521. Mounted on the shaft 15 adjacent the inner surface of base plate 12 is a latch plate member generally indicated at M. The spiral latch spring 16 has its inner end secured to the inner end of shaft 15 and its outer end anchored to the side flange 13 of the latch frame.

In common with the latches of the above-referred to patent and application, latch spring 16 at all times urges the latch member L in unlatching direction (clockwise as seen in Figure 2) and, as latch plate M is mounted on shaft 15 for movement with latch member L, it will have corresponding rotary movement. A cover plate or disc 17 for the spring 16 is also mounted on the end of shaft 15 and is shown partially broken away in Figure 2 to permit a direct view of the main latching tooth 18 and secondary latching tooth 19 of the latch plate M. Circumferentially spaced from secondary tooth 19 on the latch plate M is an unlatching stop lug 20, the function of which will be later described.

As seen in Figure 2, the parts are in door latched and door locked positions. The latch member L has its depending bifurcated legs in position to encompass the keeper pin (not shown) and hold the door in closed position. In order to maintain the latch member L in the full latched position of Figure 2 a detent member, generally indicated at D, is provided. A pin 21 carried by base plate 12 forms a pivotal support for detent D and the downwardly projecting arm portion 22 of detent D has formed thereon a latch holding portion or pawl 23. To constantly urge detent member D in latch holding direction (clockwise as seen in Figure 2) a spring 24 is provided which is supported and held in position by an enlarged head on pivot pin 21 and which has its end 24' fixed by bearing against the outer convolution of spring 16 and its free end portion 24" engaging the offset portion 25 of the transversely extending arm 26 of detent member D to urge same in latch holding (clockwise in Figure 2) direction.

Figure 4:
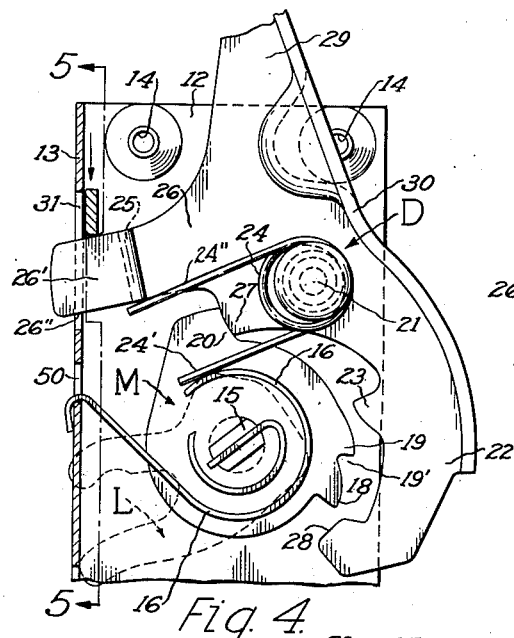
Figure 4 is a detached view of the door control mechanism of Figures 2 and 3, taken substantially on the same plane as Figure 2 but with certain parts omitted for clearness, showing the illustrated parts as they appear when the lock is unlocked and the inside remote control operating means has been moved as far as it can go in unlatching direction.

Figure 4 illustrates the unlatched position of latch member L and it will be understood that when the door is closed latch member L moves in counterclockwise direction into the latched position of Figure 2. As spring 24 urges detent D in latch holding direction the latch holding pawl 23 of detent D will, during closing of the door, first drop into the notch 19' behind the secondary latching tooth 19 and then, as the door reaches full latched position, drop down into latch holding position as seen in Figure 2 in engagement with main latching tooth 18. To release the latch mechanism the detent D is actuated, in a manner to be later described, to move the lower arm portion 22 thereof in counterclockwise direction (Figure 2) to clear the outer end of tooth 18 to permit the latch member L to rotate in clockwise or unlatching direction until it reaches the unlatched position of Figure 4 in which the unlatching stop lug 20 on latch plate M is in engagement with a corresponding stop lug 27 on detent D. Movement of detent D in latch holding direction is limited by engagement of a projection 28 on the end of lower arm 22 of detent D with the outer face of latch plate M. This engagement prevents the pawl 23 from striking the edge of latch plate M when it snaps into latch holding position under the influence of spring 24. The latch and detent mechanism described above, which as an assembly may be termed a latch unit, is fully described and claimed in the copending United States patent application of Edwin L. Allen, Serial No. 131,296, filed December 6, 1949, and cross reference is hereby made thereto.

The detent D, generally speaking, lies substantially in the plane of the latch plate M and in close proximity to the base plate 12. However, an offset portion 25 of transverse arm 26 extends inwardly and the end portion 26' is disposed in generally parallel but substantially spaced relation to the base plate 12 to accommodate the locking mechanism as will be later described. Detent member D also includes an upwardly extending arm portion 29 and the inwardly projecting flange 30 extends from the upper end of arm 29 to the lower portion of arm 22. This flange serves to stiffen the detent structure and also provides an abutment against which the push button plunger 4 engages when push button 2 is moved to operate the latch mechanism.

The general form and arrangement of detent, latch member, and latch plate so far described in this specification is substantially like that described and claimed in the said copending patent application of Edwin L. Allen, Serial No. 131,296, filed December 6, 1949, and accordingly no claim is made herein to the arrangements claimed in said copending application.

The end 26' of transverse detent arm 26 acts as a lock hold out portion as will appear later and extends through and is guided by an elongated slot 31 in the side flange 13 (see Figures 2, 5, etc.). As the detent member D is moved between its latch holding position seen in Figure 2 and its latch released position seen in Figure 4 (Figure 4 showing the maximum latch releasing movement of detent D by the inside remote control as will be later explained) the end 26' moves in the slot 31.

In order to lock the detent D in latch holding position (Figure 2), and thus prevent unlatching and opening of the door C, a lock member, generally indicated at B, is pivotally mounted on the side flange 13 by a suitable pin 32. The upwardly extending portion 33 of lock member B has a detent restraining projection 34 which, when the lock member B is in locked position as seen in Figures 2 and 3, is disposed across the slot 31 below the lower edge of end 26' of detent arm 26. It will be observed that when in this position the detent D cannot be moved in unlatching direction sufficiently to permit pawl 23 to clear tooth 18 to release the latch member L for door opening movement.

When the detent member D is in latch holding position (Figures 2 and 3) the lock member B may be moved at will into and out of locked position. The unlocked position of lock member B is clearly seen in Figure 5. This locking and unlocking movement may be effected by the inside lock knob 35 mounted on the operating rod 36, which is secured at its lower end to the lower portion 37 of lock member B, or by the outside key operated mechanism to be later described. Rod 36 extends up through the garnish molding 11 of the door in well known manner. When knob 35 is in its lower position, seen in full lines in Figure 2, the lock member B is in locked position and when the knob 35 is lifted into its upper position, seen in phantom lines in Figure 2, the accompanying upward movement of rod 36 will move lock member B from the locked position of Figure 3 into the unlocked position of Figure 5. It will be understood that the knob 35 is illustrative of only one of various inside lock operating means which can be used. For example, the lock member B can be connected to be operated from locations other than on the garnish molding or by suitable movement of the usual remote control handle.

A snap-over spring 38 has one end 38' fixed to the side flange 13 of the frame structure and its other movable end 38" connected to the lower portion 37 of lock member B. As the ends of this spring 38 are constantly urged apart the lock member B will be urged in locking direction (counterclockwise as indicated by the arrow in Figure 3) when in locked position and in unlocking direction (clockwise as seen in Figure 5) when in unlocked position. The action of the spring 38 changes or snaps over when the movable end 38" thereof crosses the common center line drawn between center of the pivot pin 32 and the fixed end 38' of spring 38. As will be again referred to later, this snap-over action occurs after the outer corner of detent restraining portion 34 of lock member B has passed, when moving in locking direction, its intermediate or preset position seen in Figure 7. Thus, when lock member B is in its intermediate or preset position, the function of which will be later described, spring 38 urges it in unlocking direction.

The result of this arrangement of spring 38 is that lock member B will not remain in preset position (Figure 7) if moved thereinto by operation of the inside lock knob 35 but will spring back into unlocked position as soon as knob 35 is released. In like manner lock member B cannot be placed and held in preset position in engagement with the side face of end portion 26' of detent D by means of the key-actuated mechanism generally indicated at K in Figure 2.

Figure 7:
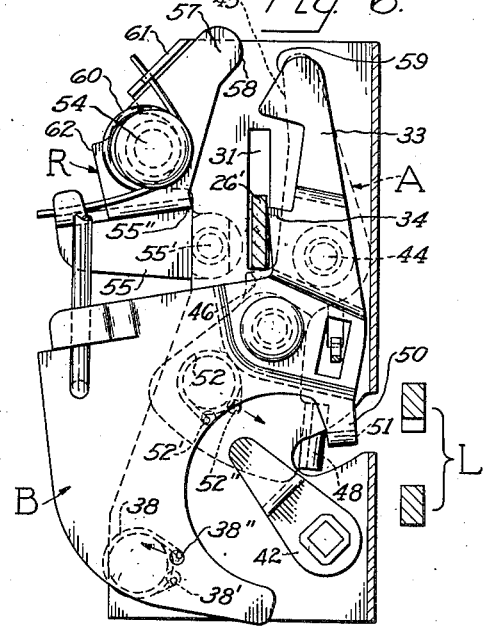
Figure 7 is a vertical cross-sectional view taken substantially on line 7—7 of Figure 6.

This key controlled lock operating means is substantially identical with that disclosed and claimed in the copending United States patent application of Edwin L. Allen, Serial No. 76,023, filed February 12, 1949, and will be only briefly described here. A cylinder lock 39 of suitable type is adapted to be operated by a key 40 and the connecting shaft 41 operates the rotatable finger 42 (Figure 3) which is supported by the side flange 13 and operates within a generally C-shaped recess 43 in the lower portion 37 of lock member B. As seen in Figures 3, 5 and 7 of the drawings the finger 42 is in a mid or neutral position. Rotation of finger 42 through a predetermined arc in either direction from its mid-position may be effected by proper turning of the key 40. Cylinder lock 39 is of the type wherein the key cannot be removed except when the lock is in its neutral or mid-position and thus finger 42 must always be returned to mid-position to permit the operator to remove the key. This arrangement permits lock member B to be moved into and out of locked position, when the latch member is held in door fully latched and locked position (Figures 2 and 3) by detent D, either by the inside knob 35 or the outside key mechanism K regardless of the position the lock member B may be in.

In order to provide means, operable upon suitable movement of detent D by the push button 2, for: (1) moving the lock member B from unlocked position as seen in Figure 5 in locking direction into preset position in blocked engagement with end portion 26' of detent D as seen in Figure 7, and (2) retaining lock member B in said preset position against the above described action of spring 38 tending to move it out of preset position and back to unlocked position, and (3) automatically moving the lock member B into full locked position when the latch member L reaches its full latched position, I employ a lock actuating member, generally indicated at A, which is pivotally supported on a pin 44 and is disposed on the outer face of side flange 13.

Figure 5:
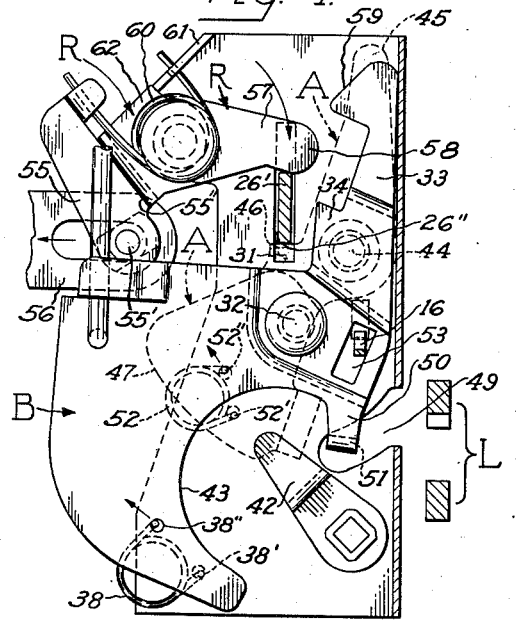
Figure 5 is a view taken substantially on line 5—5 of Figure 4.

As is clearly seen in Figures 2, 3 and 5, actuating member A has an upwardly extending arm 45 and a shoulder 46 adjacent the pivot pin 44. The lower portion 47 of member A is offset in slightly spaced relation from the outer face of side flange 13 (see Figure 2) and is provided with an inwardly bent flange 48 at its lower end which rides upon the outer face of flange 13 (see Figure 2). It will be seen from Figure 3 that side flange 13 has a cut-out slot 49 extending from the junction of base plate 12 and side flange 13 in a direction generally on a radius struck from the center of lock member pivot pin 32. Lock member B has a tang 50 the outwardly projecting end 51 of which extends through slot 49 into the path of travel of flange 48 on lock actuating member A.

As seen in Figures 3, 5 and 7, a snap-over spring 52 has a fixed end 52' anchored in side flange 13 and a movable end 52" secured to the lower portion 47 of lock actuating arm A. This spring 52 is so arranged that when the actuating member A is in its idle or retracted position seen in Figure 5, the spring 52 urges member A toward its said idle position in clockwise direction as indicated by the arrow in Figure 5. As member A moves from its idle position of Figure 5 into its lock preset position of Figure 7, the free or movable end 52" of spring 52 crosses the common center line drawn between the center of pivot pin 44 and the fixed end 52' of spring 52, thus reversing the action of spring 52 from that of Figure 5 and causing it to urge actuating member A in locking direction (counterclockwise as shown by the arrow in Figure 7). A rectangular opening 53 is cut in the lock member B just above the tang 50 to permit the fixed end of latch spring 16 to extend therethrough without interference with the movement of lock member B.

The operation of the above described mechanism to effect locking of the door from outside of the vehicle by a simple but distinctive manipulation of the outside operating member (push button 2) will now be explained.

When the door is open and the mechanism is unlatched and unlocked the parts assume the positions shown in Figures 4 and 5 except that in these views the detent D has been rotated in unlatching (counterclockwise) direction slightly beyond the normal door open unlatched position thereof in which the latch holding portion or pawl 23 on detent D would be held against the edge of latch plate M by the spring 24. The additional movement of detent D in unlatching direction shown in Figures 4 and 5 is to illustrate the greatest possible latch releasing movement of detent D by means of the inside remote control, as will be later explained. However, the views will serve to illustrate the starting positions for my improved automatic locking operation.

Figure 6:
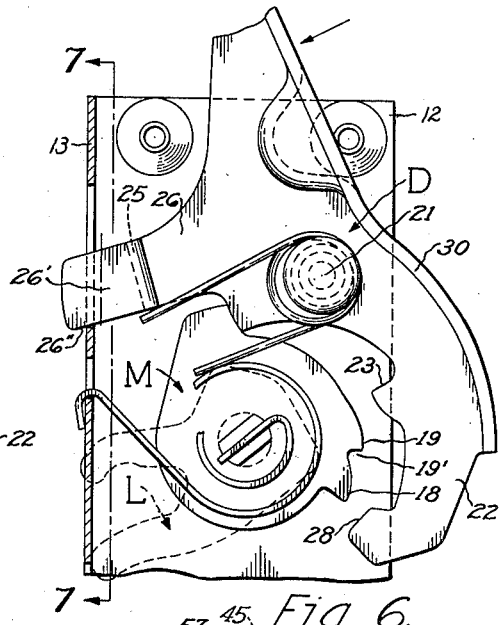
Figure 6 is a view generally similar to Figure 4 but showing the positions of the parts when the outside latch operating member has been manipulated, with the latch member in unlatched position, so that the door will be locked upon closing thereof.

With the parts in unlatched and unlocked positions and the door open, the operator pushes inwardly on the push button 2 to move the detent D in counterclockwise direction, beyond its latch released position described above, into the locking, or more specifically presetting, position shown in Figures 6 and 7. When the end 26' of the transverse arm portion 26 of detent D is in the position shown in Figures 4 and 5 it has just contacted the shoulder 46 on lock actuating member A which shoulder, as seen in Figure 5, extends across the slot 31. Further counterclockwise movement of detent D into the position shown in Figures 6 and 7 causes bottom edge 26" of end portion 26' (which bottom edge 26" may be termed the locking portion of detent D) to act upon shoulder 46 to rotate the lock actuating member A from its idle position seen in Figure 5 into its preset position shown in Figure 7. During this movement of member A the flange 48 thereof engages the bent end 51 of tang 50 on the locking member B to move same in locking direction until it reaches the preset position seen in Figure 7.

Although, as previously explained, lock member snap-over spring 38 urges the lock member B in clockwise or unlocking direction when in the preset position of Figure 7, this force is overcome by the lock actuating member snap-over spring 52 which, as indicated by the arrow in Figure 7, is urging the lock actuating member A in counterclockwise or locking direction. Springs 38 and 52 are so positioned and of such relative strengths that spring 52 will overcome spring 38 when the parts are in the preset positions of Figure 7 and further will, when the lock hold out portion 26' of detent D moves upwardly from the position shown in Figure 7 to the top of slot 31 (seen in Figure 3) upon closing and full latching of the door, automatically move both the actuating member A and the lock member B into locked position (Figure 3).

Thus, after the operator pushes the outside operating member (push button 2) from its normal non-operating position seen in Figure 2 inwardly beyond the point required for simple unlatching of the door and sufficiently far to move detent D into the position seen in Figures 6 and 7, the lock member B will be moved toward locked position into preset position and held therein by the lock actuating member A. The lock hold-out portion (end 26' of transverse arm 26) of detent D blocks the lock member B out of locked position and holds it in its preset position and this blocking out of detent portion 26' continues after the operator removes the pressure from the push button permitting the portion 26' of detent D to move upwardly into the normal unlatched position shown in Figure 8. When portion 26' reaches this point the pawl 23 is stopped by engagement with the edge face of latch plate M.

Figure 8:
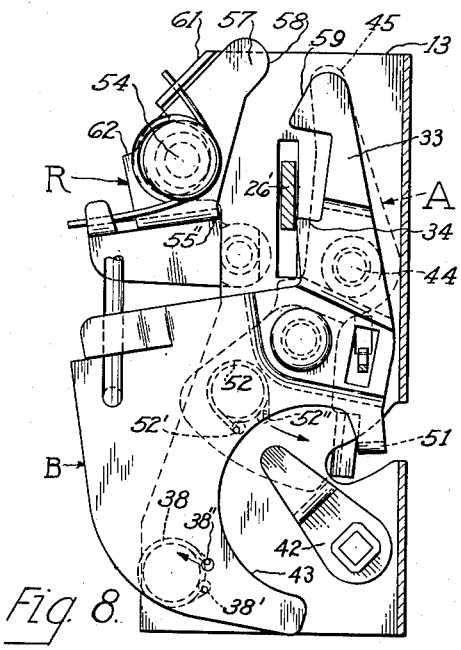
Figure 8 is a view generally similar to Figure 7 but illustrating the positions the parts assume when the operator releases the outside operating means after locking manipulation thereof but prior to closing of the door.

Furthermore, when the operator releases the pressure on the push button and then closes the door with the latch mechanism in the preset position shown in Figure 8, the pawl 23 of detent D will snap into its secondary latched position in notch 19' on latch plate M as the latch member L swings in latching direction in contact with the keeper pin (not shown) on the door frame. If the door is not shut with sufficient force for full latching the pawl 23 will stop in engagement with the secondary latch tooth 19 and latch member L will be held in secondary latch position. However, such movement of detent D into its secondary latched position will not lift the lock hold-out portion 26' far enough above the normal latch released position thereof, seen in Figure 8, to permit the detent restraining portion 34 of lock member B to snap into locked position beneath the end portion 26'. Thus the mechanism will not become locked in secondary latched position. However, upon the latch member reaching its full latched position and the detent falling into its latch holding position seen in Figure 2, the end or hold out portion 26' will have been lifted above the corner of detent restraining portion 34 thus permitting the snap-over spring 52, acting through the lock actuating member A and the engagement of the bent flange 48 thereon with the inwardly turned end 51 of the lock member B, automatically to move the lock member into locked position seen in Figure 2. In the copending United States patent application of Edwin L. Allen, Serial No. 769,688, filed August 20, 1947, now Patent No. 2,480,688 dated August 30, 1949, there is described and claimed an automatic lock mechanism by which automatic locking may be effected upon closing the door and cross-reference is accordingly made thereto.

In addition to means for operating the latch mechanism from outside the door, it is of course necessary to provide mechanism for releasing the latch from inside the door. Referring particularly to Figure 3, the inside operating means includes a bell crank member R pivotally supported on a headed pin 54 carried by the side flange 13. The lower arm 55 of bell crank R carries a headed pin 55' by which the inside remote control strap 56 is operatively connected to the bell crank. The upper arm 57 of bell crank R has a camming end face 58 which, under conditions to be later described, will engage the inclined edge surface 59 at the end of upper portion 33 of lock member B. The bell crank spring 60 is positioned by the pivot pin 54 and has a fixed end 60' held by a lug 61 on side flange 13 and a free end 60'' engaging the lower arm 55 of bell crank R. Spring 60 always urges the bell crank toward its normal non-operating position seen in Figure 3. Movement of bell crank R beyond this normal non-operating position is prevented by engagement of an offset 55'' on the lower arm 55 with the edge of side flange 13 as seen in Figures 3, 7 and 8.

When a pull is exerted upon the strap 56 by suitable inside remote control means, such as a handle or the like mounted on the inner panel of the door, the bell crank R may be moved in latch releasing (clockwise) direction into the position shown in Figure 5 but no further due to blocking engagement of a shoulder 62 on the hub portion of bell crank R with the end of fixed lug 61. Assuming that the lock member B is in locked position as seen in Figure 3 when the remote control mechanism is operated, the first movement of bell crank R in clockwise direction will cause the camming face 58 to strike the inclined face 59 on lock member B pushing it in unlocking direction. As lock member B moves in unlocking direction under pressure from remote control bell crank R, the end 51 of tank 50 will push against the flange 48 on the lock actuating member A, thus also moving member A in clockwise or unlocking direction (as seen in Figure 3). Before the lower edge of upper bell crank arm 57 engages the upper edge of end portion 26' of detent D the lock member B will have been cammed in unlocking direction a distance sufficient to cause the snap-over springs 38 and 52 to change their direction of pressure and both the lock member B and the lock actuating member A will move over into their unlocked positions as seen in Figure 5. Further rotation of bell crank R will cause the upper end 57 thereof to engage the end portion 26' of detent D and move it downwardly from the position shown in Figure 3 until the pawl 23 clears the main latching tooth 18, releasing the latch mechanism and permitting the door to open. The maximum possible movement of bell crank R in unlatching direction is seen in Figure 5 and it will be noted that when in this position the end portion 26' of detent D has not been moved downwardly enough to cause effective movement of lock actuating member A in latching direction.

From the above it will be seen that if the door is closed, latched, and locked, and the inside remote control means is operated, the latch mechanism will first automatically be unlocked and then unlatched. However, the inside remote control mechanism cannot be operated to effect presetting of the lock mechanism for automatic locking upon closing the door. As explained previously, if the door is open and the latch parts are in unlatched position, pushing down on the inside lock knob 35 will not effect presetting of the lock mechanism for automatic locking as such movement of knob 35 will not operate the lock actuating member A and therefore the snap-over spring 38 will return the lock member B to unlocked position and lift the knob 35 back to its phantom position in Figure 1 upon release of pressure thereon.

Thus, with the arrangement described, the operator can only preset the lock, for automatic locking upon closing the door, by moving the outside operating means (the push button 2) from its normal non-operating position beyond its unlatching position into its locking position and then releasing the outside operating means and closing the door. This operation must be done consciously and voluntarily by the operator and is not done at any time in the operation of the mechanism except when he desires to lock the door from outside without use of the key. By providing this distinctive operation the chances of the operator locking the door with the key inside the car are substantially eliminated. It will also be apparent, of course, that if the operator has fully closed the door but has not preset the lock he can still lock the door by means of the key.

With the apparatus described the door cannot accidentally become locked in its secondary latched position if the operator should fail to swing the door with sufficient force to reach the full latched position. This is considered to be advantageous as it eliminates the possibility of the door being locked in secondary latched position which would necessitate the operator getting out his key to unlock the door and then starting all over to effect proper closing and locking thereof. With the described arrangement, if the door should stop in secondary latched position when the operator is utilizing the automatic locking procedure, he need only push the button 2 inwardly to release the latch and then, when the door opens again, push the button 2 in beyond its normal latch released position into locking position (sometimes called lock presetting position) and again shut the door with sufficient force to effect full closing and latching thereof.

Figure 9:
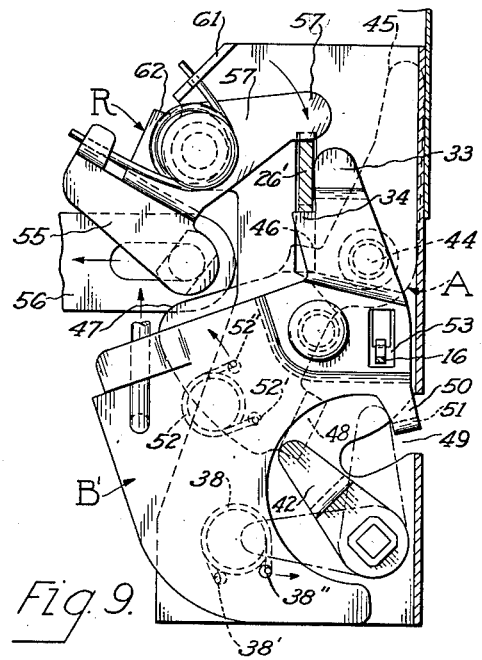
Figure 9 is a view generally similar to Figures 5, 7 and 8, but illustrating a modified form of my mechanism in which unlatching movement of the inside remote control means will not unlock the door from locked position, the parts being shown in the positions they assume when the latch member is in full latched position and the lock has been locked by its inside actuating means.

In some cases, particularly for rear doors of four-doored vehicles, it is deemed desirable to have the remote control mechanism so arranged that unlatching movement thereof will not effect unlocking of the door, provided it has previously been locked. Figure 9 illustrates a modification of the apparatus previously described wherein the remote control bell crank R cannot be actuated to unlock and unlatch the door if it is locked. To accomplish this change in the mode of operation of the remote control mechanism it is only necessary to omit the upper end of arm 33 of lock member B, thus eliminating the inclined face 59 as clearly seen in Figure 9. As shown in this view, the lock member B' is in locked position and pull is being exerted on remote control strap 56 to swing bell crank R in latch releasing (clockwise) direction. The upper arm 57 thereof has engaged the end portion 26' of detent D and pushed it down against the detent restraining portion 34 of lock member B'. This feature of the illustrated apparatus is fully described and claimed in said copending patent application of Edwin L. Allen, Serial No. 131,296, filed December 6, 1949, but it will be noted that the modification described in no way interferes with or changes the automatic locking action of my mechanism.

Figure 10:
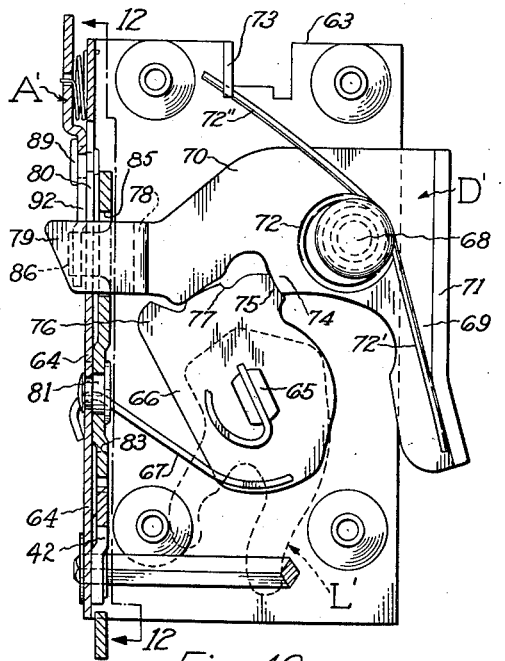
Figure 10 illustrates a modified form of a latch mechanism in which my improved lock operating means has been incorporated, the parts being shown in their latched and locked positions and the section being taken substantially on line 10—10 of Figure 12.

In Figures 10 to 15 inclusive, I have illustrated my invention as incorporated in a latch mechanism of a somewhat different type than that shown in Figures 1 to 9 inclusive. The general arrangement of the latch mechanism of Figures 10–15, except for the lock operating apparatus, is like that fully described and claimed in the Edwin L. Allen United States patent application Serial No. 76,023, filed February 12, 1949, and cross-reference is hereby made thereto. The frame structure includes a base plate 63 and a side flange 64. Latch member L' is supported on a shaft 65 which also carries the latch plate member 66. Latch spring 67 urges shaft 65, latch member L', and latch plate 66 in unlatching (clockwise as seen in Figure 10) direction.

In order to hold the latch L' in latched position a detent member D' is pivotally mounted on a suitable pin 68 carried by base plate 63. Detent member D' includes a downwardly extending arm portion 69 and a transversely extending arm portion 70. The inwardly projecting detent flange 71 is engaged at its lower end by suitable outside operating means, such as a push button of the type illustrated in Figure 2, and also acts as an abutment for the lower end 72' of detent spring 72. The upper end 72'' of spring 72 is anchored by a lug 73 struck out from base plate 63 and the spring urges detent D' in latch holding direction (counterclockwise as seen in Figure 10).

Figure 11:
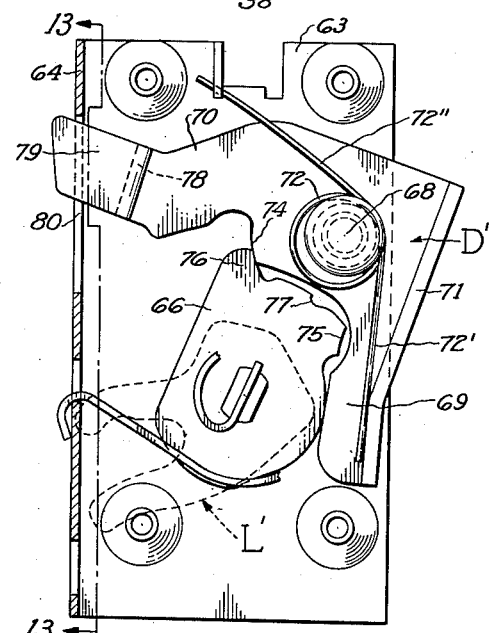
Figure 11 is a view similar to Figure 10 and illustrating the same mechanism but showing the parts in the positions they assume when the door is unlatched and the outside operating member and the detent are in their locking positions.

When in latched position (Figure 10) the latch holding portion 74 of detent D' is disposed in abutting latch holding engagement with main or full latch stop portion 75 of latch plate 66. To release the latch and permit opening of the door, detent D' is rotated in latch releasing direction (clockwise as seen in Figure 10) to lift the transverse arm 70 sufficiently to move latch holding portion 74 out of engagement with the stop portion 75 of latch plate 66. This permits the latch plate 66 and latch member L' to rotate in unlatching direction (clockwise as seen in Figures 10 and 11) into unlatched position as seen in Figure 11 with the stop lug 76 of latch plate 66 abutting the latch holding portion 74 of detent D' and blocked against further movement in unlatching direction thereby. A secondary latch stop portion 77 is preferably also provided on the latch plate 66.

This particular arrangement of latch plate and detent is advantageous in installations where it is desired to have the outside operating push button or handle disposed substantially at the horizontal level of the latch member L' while the embodiment illustrated in Figures 1 to 9 inclusive is particularly useful in installations where the outside operating member is to be positioned substantially above the latch member.

The transverse arm 70 of detent D' has an offset portion 78, generally similar to offset portion 25 in Figures 1 to 9, and an outer end portion 79 which extends through and is guided by a slot 80 in the side flange 64 of the frame structure and which serves to block the lock member B'' in preset position and also to actuate the lock actuating member A' as will later appear.

Figure 12:
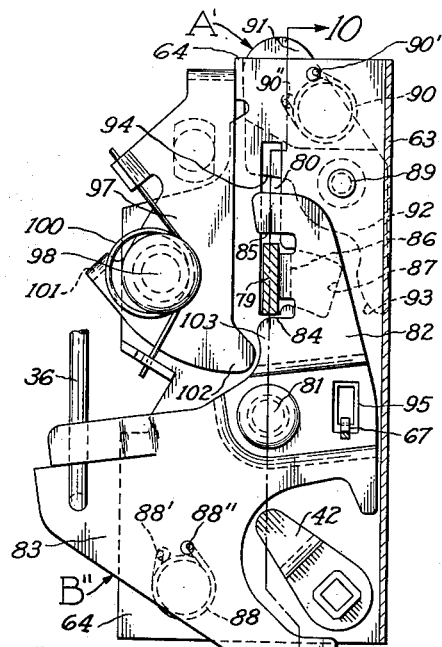
Figure 12 is a vertical cross-sectional view taken substantially on line 12—12 of Figure 10.
Figure 13:
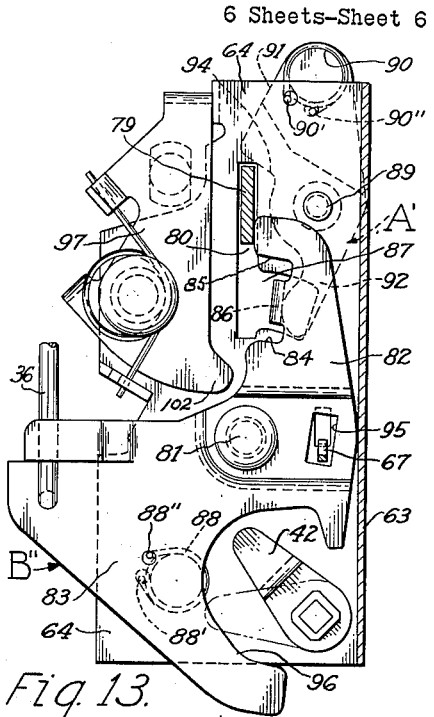
Figure 13 is a vertical cross-sectional view taken substantially on line 13—13 of Figure 11.
Figure 14:
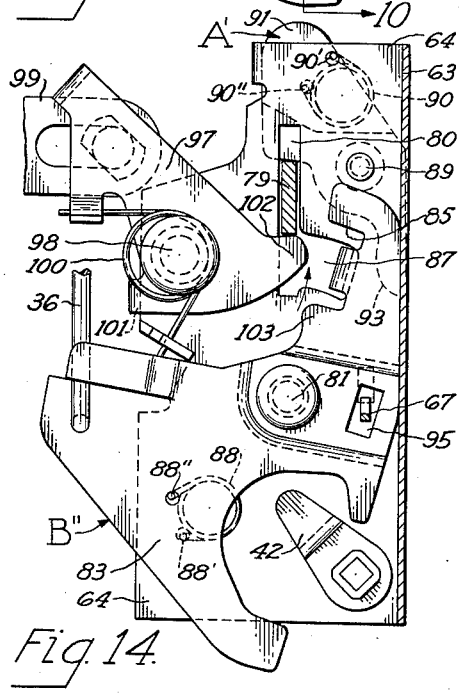
Figure 14 is a view generally similar to Figures 12 and 13, illustrating the same apparatus but showing the positions of the parts upon operation of the inside remote control mechanism to release the latch when it is either locked or unlocked and indicating how the remote control mechanism is blocked against movement to effect locking of the latch.

In Figures 10 to 14 the lock member B'' is pivotally supported by a pin 81 carried by side flange 64 and has an upwardly extending arm portion 82 and a lower portion 83. A lower shoulder 84 and an upper detent restraining shoulder 85 are formed on the upper arm 82 and the operating flange 86 is bent outwardly from upper arm portion 82 between shoulders 84 and 85 and projects out beyond side flange 64 through a cut-out or slot 87 therein. This cut-out or slot 87 joins the lower end of slot 80. In order to give the desired action to lock member B'' a snap-over spring 88 has one end 88' anchored to the side flange 64 and the other movable end 88'' connected to the lower portion 83 of lock member B''. When in latched and locked position, seen in Figures 10 and 12, spring 88 urges lock member B'' in locking direction (counterclockwise in Figure 12) and holds it in locked position. When lock member B'' in unlocking direction (clockwise as seen in Figure 14) and holds it in unlocked position. If the lock member B'' is moved only into its preset or blocked position (seen in Figure 13) by means of the rod 36 and the inside knob 35, the detent member being in secondary latched position or in latch released position, the spring 88 will be still effective to urge member B'' in unlocking direction (clockwise as seen in Figure 13) and will return lock member B'' to its unlocked position (as seen in Figure 14) when pressure on knob 35 is released. Thus, with this embodiment as with the previously described form of my invention, the lock cannot be preset by use of the inside lock operating knob 35. It can, however, be moved into and out of full locked position by the inside knob 35 and rod 36 when the latch member is latched and the detent D' is in latch holding position as seen in Figures 10 and 12.

In order to effect presetting of the lock mechanism by means of a suitable distinctive manipulation of the outside operating member I provide a lock actuating member A' which is pivotally supported on the outer face of side flange 64 by a pivot pin 89. A lock actuating member snap-over spring 90 has one end 90' anchored to the side flange 64 and its other movable end 90'' secured to the upper end portion 91 of lock actuating member A'. This snap-over spring 90 is so arranged relative to the pivot 89 of lock actuating member A' that, when the lock actuating member is in its idle or retracted position as seen in Figure 12, it urges the lock actuating member in counterclockwise direction (Figure 12) and holds the upper end portion 91 thereof against a bent out tang on side flange 64. At a point in the movement of lock actuating member A' from the idle position of Figure 12 into the preset position of Figure 13 the free end 90'' crosses the common center line of pivot 89 and fixed end 90' and thereupon the spring 90 reverses its action and urges lock actuating member A' in clockwise direction (Figure 13) toward its preset and its locked positions.

As is clearly seen in Figures 10, 12 and 14, the edge face 93 of lower end 92 of lock actuating member A' is disposed to engage the outwardly projecting operating flange 86 on lock member B''. In order to effect the desired operation of lock actuating member A' by the end portion 79 of detent D', a shoulder 94 is formed on the upper end portion 91 of lock actuating member A' and this shoulder extends across the slot 80 when actuating member A' is in its retracted or idle position (see Figure 12). A hole 95 in lock member B'' permits the end of latch spring 67 to extend therethrough without interfering with the required movement of member B'', and the outside key lock operated finger 42 cooperates with a generally C shaped cutout 96 in the lower end portion 83 of lock member B'' to effect locking and unlocking from outside the vehicle by means of a key in the manner previously described.

Inside operating means are provided which include a remote control bell crank member 97 supported on a suitable pivot pin 98 and operatively connected to the strap 99. Spring 100 is arranged to urge bell crank 97 towards its normal or non-operating position seen in Figures 12 and 13 and, when the remote control mechanism is actuated to exert a pull on strap 99, bell crank 97 will be moved toward latch releasing position shown in Figure 14. This movement will, assuming that the lock member B'' is in unlocked position as seen in Figure 14, lift the end portion 79 of detent D' into latch released position (Figure 14) and permit movement of the latch member L' into unlatched position. An outwardly bent flange 101 on bell crank 97 is disposed to engage the edge of side flange 64 as seen in Figure 14 and thus limits the latch releasing movement of bell crank 97 so that it cannot lift the transverse arm 70 of detent D' sufficiently to cause the end portion 79 thereof to move the lock actuating member A' in material degree from its idle position. Thus the lock mechanism cannot be preset or locked by means of the inside remote control mechanism.

The detent engaging finger portion 102 of bell crank 97 serves to operate the detent D' as described above and also, provided the lock member B' is in locked position as seen in Figure 12, will engage the cam portion 103 on the lock member B'' and push the lock member in unlocking direction sufficiently so that the action of snap-over springs 88 and 90 will be reversed and move lock actuating member A' and lock member B'' into their full unlocked positions as seen in Figure 14. With this arrangement, even if the latch mechanism has been locked, operation of the remote control bell crank 97 toward latch released position will first unlock the mechanism and then move the detent into latch released position. If this mode of operation of the inside remote control is not desired, it is only necessary to omit the cam portion 103 from lock member B'' as is shown on the lock member B''' of Figure 15. Aside from the omission of this camming element the mechanism of Figure 15 is substantially identical with that shown in Figures 10 to 14, and Figure 15 illustrates how, when the lock B''' is in locked position, an attempt to unlatch the door by the remote control strap and bell crank 97 will merely result in pushing the end portion 79 of detent arm 70 up against the locking or detent restraining portion 85 of lock member B'''.

Figure 15:
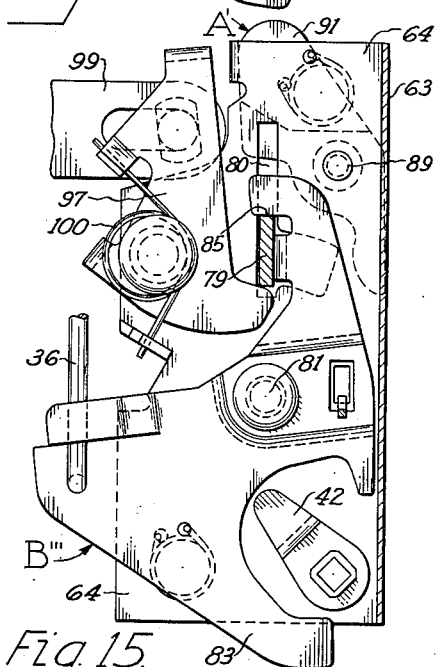
Figure 15 is a view illustrating a modified form of the mechanism of Figures 10 to 14 in which operation of the inside remote control mechanism will not unlock the door from locked position. This view corresponds to Figure 9 which illustrates a similar modification of the first embodiment.

The geometry of the parts of the apparatus of Figure 15 is such that pressure of the detent against the lock member will not tend to move lock member in unlocking direction. This geometry is also present in the other embodiments of my invention so that any force exerted in an effort to move the detent to unlatched position when the lock is in locked position cannot move the lock into unlocked position but rather will tend to hold it in locked position. This feature, along with various other features of the mechanism shown in Figures 10 to 15 which are distinct from the automatic locking and presetting features thereof, are described and claimed in the above noted copending patent application of Edwin L. Allen, Serial No. 76,023, filed February 12, 1949.

Assuming that the door is open, the latch mechanism is unlatched, and the operator desires that the door be locked when he swings it into fully closed and latched position, the necessary manipulation and operation of the mechanisms of Figures 10 to 15 will now be described. With the door open the outside operating member, such as push button 2 of Figure 2, will be in its normal non-operating position. The operator will manipulate the outside member to move it against the resistance imposed by its own spring means (as for example spring 5 in Figure 2) and the detent spring 72 until the detent D' reaches latch released position (Figure 14). He will continue to move the outside operating member on beyond its latch releasing position to its locking position and it will be noted that during this further movement an additional resistance will be imposed which can be felt by the operator. This added resistance is due to the end portion 79 of detent D' engaging shoulder 94 on lock actuating member A' and starting to move it against the force of snap-over spring 90. Before the outside actuating member A' and detent D' reach their maximum lock presetting positions seen in Figure 13 snap-over spring 90 will reverse its action and the added resistance to movement of the outside actuating member will be removed. However, the added resistance at the start of the locking movement of the outside operating member, which is also present in the embodiment shown in Figures 1 to 9 due to the action of lock actuating member snap-over spring 52, is helpful in avoiding inadvertent movement of the outside operating member beyond its normal latch releasing position during simple unlatching of the door from the outside.

When the lock actuating member A' is moved from its idle position of Figure 14 toward its lock preset position of Figure 13, the edge 93 of the lower end 92 thereof engages the outwardly projecting operating flange 86 on lock member B'' and moves lock member B'' from its unlocked position of Figure 14 in locking direction. When snap-over spring 90 reverses its action, as described above, the lock actuating member A' will move under the influence of spring 90 into the preset position of Figure 13 and carry with it lock member B''. As described above in explaining the operation of the mechanism of Figures 1 to 9, the lock actuating member snap-over spring 90 is of such strength, and the parts are so proportioned and arranged, that spring 90 will hold the lock member B'' in preset position even though the snap-over spring 88 is still urging lock member B'' in unlocking direction and will positively move it on into locked position when the lock holdout portion 79 of detent D' is withdrawn.

When the door is fully closed and detent D' moves into its full latched position of Figure 10 lock member B'' will be moved on into its full locked position of Figure 12 because of the action of spring 90 and because the lock hold out portion 79 of detent D' has been moved out of lock hold-out position in which it blocks the upper end of lock member B'' out of locked position.

Thus with the apparatus of Figures 10 to 15, as with the mechanism of Figures 1 to 9, the operator may effect automatic locking of the door from outside, without use of the key, by moving the outside operating member in latch releasing direction beyond its normal latch released position and then swinging the door to closed position. Due to the additional resistance to movement of the outside operating member, which is imposed at least during the initial part of the locking travel thereof, the operator will not accidentally preset the lock mechanism when he operates the outside operating member in normal manner merely to open the door from outside.

Although I have described in considerable detail the illustrated embodiments of my invention it will be understood by those skilled in the art that various modifications may be made in the form and in the arrangement of the parts of the mechanism which effect my improved mode of operation without departing from the teachings and disclosures herein contained. My improved lock control means may readily be incorporated in various different types of latch units than those herein illustrated and, accordingly, I do not wish to be limited to the specific structures herein shown and described but claim as my invention all embodiments thereof coming within the scope of the appended claims.

I claim:

1. Door latching and locking mechanism including a latch unit adapted in latched position to hold a door closed, an outside latch unit operating member for releasing said latch unit to permit opening of the door, and lock means for preventing release of said latch unit from said latched position by said outside latch unit operating member, said lock means having locked and unlocked positions, said outside latch unit operating member being supported for movement in unlatching direction from a normal non-operating position to a latch unit releasing position and for further movement in unlatching direction from said latch unit releasing position to a locking position, and operating connections between said outside latch unit operating member and said lock means whereby when said outside latch unit operating member is moved from said latch unit releasing position to said locking position said lock means will be moved from said unlocked position toward said locked position.

2. Door control mchanism including a latch member supported for movement between latched and unlatched positions and adapted when in latched position to coact with a keeper member to hold a door in closed position, a lock member supported for movement between locked, preset, and unlocked positions, said lock member being adapted, when in locked position, to prevent movement of said latch member from said latched position to said unlatched position, means, including an outside operating member, for effecting release of said latch member from latched position, said outside operating member being movable from a normal non-operating position through a latch member releasing position into a lock member presetting position, means, operable by movement of said outside operating member from said latch member releasing position to said lock member presetting position, for moving said lock member from unlocked position to preset position, means, effective upon said lock member when in said preset position, for moving said lock member from said preset position into said locked position when said latch member is in latched position, and means for blocking said lock member against movement from said preset position into said locked position except when said latch member is in latched position.

3. Door control mechanism including a latch member supported for movement between latched and unlatched positions and adapted when in latched position to coact with a keeper member to hold a door in closed position, a lock member supported for movement between locked, preset, and unlocked positions, said lock member being adapted, when in locked position, to prevent movement of said latch member from said latched position to said unlatched position, means, including an outside operating member, for effecting release of said latch member from latched position, said outside operating member being movable from a normal non-operating position through a latch releasing position into a lock presetting position, means, operable by movement of said outside operating member from said latch releasing position to said lock presetting position, for moving said lock member from unlocked position to preset position, means for moving said lock member from said preset position into said locked position, and means for blocking said lock member out of locked position when said latch member is in unlatched position.

4. Door control mechanism including a latch member supported for movement between latched and unlatched positions and adapted when in latched position to coact with a keeper member to hold a door in a closed position, a lock member supported for movement between locked, preset, and unlocked positions, and being adapted when in locked position to prevent movement of said latch member into unlatched position, means, including an outside operating member, for effecting release of said latch member from latched position, said outside operating member being movable from a normal non-operating position through a latch releasing position into a lock presetting position and back to normal non-operating position, spring means for urging said outside operating member toward said normal non-operating position, means, operable by movement of said outside operating member from said latch releasing position to said lock presetting position, for moving said lock member from unlocked position to preset position, and spring means, effective upon said lock member when in said preset position, for moving said lock member from said preset position into locked position when said latch member is in latched position and said outside operating member is in said normal non-operating position.

5. Door control mechanism including a latch member supported for movement between latched and unlatched positions and adapted when in latched position to coact with a keeper member to hold a door in a closed position, a lock member supported for movement between locked, preset, and unlocked positions and being adapted when in locked position to prevent movement of said latch member into unlatched position, means, including an outside operating member, for effecting release of said latch member from latched position, said outside operating member being movable from a normal non-operating position through a latch releasing position into a lock presetting position and back to normal non-operating position, spring means for urging said outside operating member toward said normal non-operating position, means, operable by movement of said outside operating member from said latch releasing position to said lock presetting position, for moving said lock member from unlocked position to preset position, spring means for moving said lock member from said preset position into said locked position, and means for blocking said lock member out of locked position except when said latch member is in a latched position and said outside operating member is in said normal non-operating position.

6. Door control mechanism including a latch member supported for movement between a latched position and an unlatched position, a detent member supported for movement from a latch holding position through a latch released position to a locking position, a lock member supported for movement between locked and unlocked positions, said lock member being adapted, when in locked position, to prevent movement of said latch member from said latched position to said unlatched position, and means whereby movement of said detent member from latch released position into locking position will, provided said lock member is in said unlocked position, move said lock member toward locked position.

7. Door control mechanism including, a latch member supported for movement between door latched and door unlatched positions, a detent member having a latch holding portion and a locking portion and being supported for movement between latch holding, latch released, and lock presetting positions, said latch holding portion, when said detent member is in latch holding position, restraining said latch member from movement in unlatching direction and, when in a latch released position, permitting movement of said latch member in unlatching direction, a lock member supported for movement between a latch locked position and a latch unlocked position and having an intermediate preset position therebetween, said lock member having a detent restraining portion adapted when in locked position to prevent movement of said detent into latch released position, said detent member having a lock hold out portion adapted to lie in the path of said lock member and to hold same out of latch locked position except when said detent is in a latch holding position, snap-over spring means for urging said lock member in latch unlocking direction when said lock member is blocked by said detent in said intermediate preset position and for urging said lock member in latch locking direction when said lock member is moved in latch locking direction a predetermined distance from said preset position, means for moving said detent member from latch holding to latch released position and beyond said latch released position into said lock presetting position, a lock actuating member supported for movement between an idle position, a preset position, and a locked position, said lock actuating member being operable by said locking portion of said detent member during its movement from said latch released position into said lock presetting position to move said lock member into said preset position in engagement with said lock hold out portion of said detent member and to hold said lock member in said preset position, and snap-over spring means arranged to urge said lock actuating member toward its idle position until it reaches a predetermined point during movement from said idle position toward its preset position and to thereupon urge said lock actuating member toward its said preset position, said last named snap-over spring means having a greater biasing force than said first named snap-over spring means when said lock actuating member is in said preset position.

8. Door control mechanism including, a latch member supported for movement between door latched and door unlatched positions, a detent member having a latch holding portion and a locking portion and being supported for movement between latch holding, latch released, and lock presetting positions, said latch holding portion, when said detent member is in a latch holding position, restraining said latch member from movement in unlatching direction and, when in a latch released position, permitting movement of said latch member in unlatching direction, a lock member supported for movement between a latch locked position and a latch unlocked position and having an intermediate preset position therebetween, said lock member having a detent restraining portion adapted when in locked position to prevent movement of said detent into latch released position, said detent member having a lock hold out portion adapted to lie in the path of said lock member and to hold same out of latch locked position except when said detent is in a latch holding position, snap-over spring means for urging said lock member in latch unlocking direction when said lock member is blocked by said detent in said intermediate preset position and for urging said lock member in latch locking direction when said lock member is moved in latch locking direction a predetermined distance from said preset position, means for moving said detent member from latch holding to latch released position and beyond said latch released position into said lock presetting position, a lock actuating member supported for movement between an idle position, a preset position, and locked position, said lock actuating member being operable by said locking portion of said detent member during its said movement from said latch released position into said lock presetting position to move said lock member into said preset position in engagement with said lock hold out portion of said detent member and to hold said lock member in said preset position, and snap-over spring means arranged to urge said lock actuating member toward its idle position until it reaches a predetermined point during movement from said idle position toward its preset position and to thereupon urge said actuating member toward its said preset position, said first named snap-over spring means and said last named snap-over spring means being of respective strengths and dispositions whereby said second named spring will overcome said first named spring when said lock member and said lock actuating member are in their preset positions and will move said lock member and said lock actuating member into their locked positions from their preset positions when said lock hold out portion of said detent member does not hold said lock member out of locked position.

9. Door control mechanism including a latch member having a door latched and a door unlatched position, an outside operating member supported for movement from a normal non-operating position through a latch releasing position to a locking position, means operable by movement of said outside operating member from non-operating position to latch releasing position for releasing said latch member for movement from door latched position to door unlatched position, lock means for preventing unlatching of said latch member, means, operable by movement of said outside operating member from said latch releasing position to said locking position, for moving said lock means in locking direction, inside operating means adapted to operate said means operable by said outside operating member for releasing said latch member for movement from door latched position to door unlatched position, said inside operating means being movable between a normal non-operating position and a latch releasing position, and means for limiting the movement of said inside operating means in latch releasing direction whereby said inside operating means is ineffective to move said lock means in locking direction sufficient to cause locking thereof.

10. Door control mechanism including a latch member, a detent member supported for movement between a latch holding position, a latch released position, and a locking position, a lock member supported for movement between locked and unlocked positions, said lock member being adapted, when in locked position, to prevent movement of said latch member from said latched position to said unlatched position, means whereby movement of said detent member from latch released position into locking position will, provided said lock member is in said unlocked position, move said lock member toward locked position, and outside operating means for moving said detent from latch holding position to latch released position and locking position.

11. Door control mechanism including a latch member, a detent member supported for movement between a latch holding position, a latch released position, and a locking position, a lock member supported for movement between locked and unlocked positions, said lock member being adapted, when in locked position, to prevent movement of said latch member from said latched position to said unlatched position, means whereby movement of said detent member from latch released position into locking position will, provided said lock member is in said unlocked position, move said lock member toward locked position, outside operating means for moving said detent from latch holding position to latch released position and locking position, and means, operable from inside the door with which the mechanism is associated, for moving said lock member between its said unlocked and locked positions independently of said means whereby movement of said detent will move said lock member toward locked position.

12. Door control mechanism including a latch member, a detent member supported for movement between a latch holding position, a latch released position, and a locking position, a lock member supported for movement between locked and unlocked positions, said lock member being adapted, when in locked position, to prevent movement of said latch member from said latched position to said unlatched position, means whereby movement of said detent member from latch released position into locking position will, provided said lock member is in said unlocked position, move said lock member toward locked position, outside operating means for moving said detent from latch holding position to latch released position and locking position, inside operating means for moving said detent only between said latch holding position and said latch released position, and means for blocking said inside operating means against movement beyond its said latch released position whereby said inside operating means is ineffective to move said detent member into its said locking position.

13. Door control mechanism including a latch member supported for movement between latched and unlatched positions and adapted when in latched position to coact with a keeper member to hold a door in closed position, a lock member supported for movement between locked, preset, and unlocked positions, said lock member being adapted, when in locked position, to prevent movement of said latch member from said latched position to said unlatched position, means, including an outside operating member, for effecting release of said latch member from latched position, said outside operating member being movable from a normal non-operating position through a latch releasing position into a lock presetting position, means, operable by movement of said outside operating member from said latch releasing position to said lock presetting position, for moving said lock member from unlocked position to preset position, means for moving said lock member from said preset position into said locked position, means for blocking said lock member out of locked position when said latch member is in unlatched position, and means, operable from inside said door, for moving said lock member between its said locked and unlocked positions independently of said means for moving said lock member from unlocked position to preset position.

14. Door control mechanism including a latch member supported for movement between latched and unlatched positions and adapted when in latched position to coact with a keeper member to hold a door in closed position, a lock member supported for movement between locked, preset, and unlocked positions, said lock member being adapted, when in locked position, to prevent movement of said latch member from said latched position to said unlatched position, means, including an outside operating member, for effecting release of said latch member from latched position, said outside operating member being movable from a normal non-operating position through a latch releasing position into a lock presetting position, means, operable by movement of said outside operating member from said latch releasing position to said lock presetting position, for moving said lock member from unlocked position to preset position, means for moving said lock member from said preset position into said locked position, means for blocking said lock member out of locked position when said latch member is in unlatched position, means operable from inside said door for moving said lock member between its said locked and unlocked positions independently of said means for moving said lock member from unlocked position to preset position, and means, effective at all times when said latch member is not in latched position, for preventing positioning of said lock member in preset position by said means operable from inside said door.

15. Door control mechanism including a latch member supported for movement between latched and unlatched positions and adapted when in latched position to coact with a keeper member to hold a door in closed position, a lock member supported for movement between locked, preset, and unlocked positions, said lock member being adapted, when in locked position, to prevent movement of said latch member from said latched position to said unlatched position, means, including an outside operating member, for effecting release of said latch member from latched position, said outside operating member being movable from a normal non-operating position through a latch releasing position into a lock presetting position, means, operable by movement of said outside operating member from said latch releasing position to said lock presetting position, for moving said lock member from unlocked position to preset position, means for moving said lock member from said preset position into said locked position, means for blocking said lock member out of locked position when said latch member is in unlatched position, inside operating means movable between a normal non-operating position and a latch releasing position for actuating said means for effecting release of said latch member from latched position to effect release of said latch member from latched position, and means for blocking said inside operating means against movement in latch releasing direction sufficiently far enough to move said lock member into its preset position.

16. Door control mechanism including a latch member supported for movement between full latched, secondary latched, and unlatched positions and adapted when in full latched position to coact with a keeper member to hold a door in full closed position, a lock member supported for movement between locked, preset, and unlocked positions, said lock member being adapted, when in locked position, to prevent movement of said latch member from said latched position to said unlatched position, means, including an outside operating member, for effecting release of said latch member from said full or secondary latched positions, said outside operating member being movable from a normal non-operating position through latch releasing position into a lock presetting position, means, operable by movement of said outside operating member from latch releasing position to said lock presetting position, for moving said lock member from unlocked position to preset position, means for moving said lock member from said preset position into said locked position, and means for blocking said lock member out of locked position when said latch member is in said secondary latched position or said unlatched position.

17. Door control mechanism including a latch member supported for movement between full latched, secondary latched, and unlatched positions and adapted when in full latched position to coact with a keeper member to hold a door in full closed position, a lock member supported for movement between locked, preset, and unlocked positions, said lock member being adapted, when in locked position, to prevent movement of said latch member from said latched position to said unlatched position, means, including an outside operating member, for effecting release of said latch member from said full or secondary latched positions, said outside operating member being movable from a normal non-operating position through latch releasing position into a lock presetting position, means, operable by movement of said outside operating member from latch releasing position to said lock presetting position, for moving said lock member from unlocked position to preset position, means for blocking said lock member against movement from said preset position into said locked position except when said latch member is in its said full latched position, and means for moving said lock member from said preset position into said locked position upon said latch member substantially reaching its said full latched position.

18. Door control mechanism including a latch member supported for movement between latched and unlatched positions and adapted when in latched position to coact with a keeper member to hold a door in closed position, a lock member supported for movement between locked, preset, and unlocked positions, said lock member being adapted, when in locked position, to prevent movement of said latch member from said latched position to said unlatched position, means, including an outside operating member, for effecting release of said latch member from latched position, said outside operating member being movable from a normal non-operating position through a latch releasing position into a lock presetting position, means, operable by movement of said outside operating member from said latch releasing position to said lock presetting position, for moving said lock member from unlocked position to preset position, means for moving said lock member from said preset position into said locked position, and means for blocking said lock member out of locked position when said latch member is in unlatched position.

19. Door control mechanism including a latch member, an outside operating member supported for movement between a normal non-operating position, a latch releasing position, and a locking position, lock means for preventing unlatching of said latch member, means, operable by movement of said outside operating member from said latch releasing position to said locking position, for moving said lock means in locking direction, and means for imposing additional resistance to movement of said outside operating member during at least a portion of its said movement from latch releasing position to locking position.

20. Door control mechanism including a latch member, an operating member supported for movement in latch releasing direction from a normal non-operating position to a latch releasing position and beyond, lock means for preventing unlatching of said latch member, and means, operable by movement of said operating member in latch releasing direction from said normal non-operating position to a point beyond said latch releasing position, for moving said lock means in locking direction.

21. Door control mechanism including latch means, an outside latch means operating member supported for movement between a normal non-operating position and a latch releasing position, lock means for preventing unlatching of said latch means, and means, operable by movement of said operating member in latch releasing direction beyond said latch releasing position, for moving said lock means in locking direction.

22. In a door control mechanism, a latch member supported for movement between a door latched and a door unlatched position, a lock member for locking said door control mechanism supported for movement between an unlocked position, a preset position, and a locked position, spring means for moving said lock member from its preset position into its locked position, an outside operating member supported for movement between a normal non-operating position, a latch member releasing position, and a lock member presetting position, and operating connections between said outside operating member and said lock member for moving said lock member from unlocked position into preset position upon movement of said outside operating member from said latch member releasing position to said lock member presetting position.

23. In a door control mechanism, a latch member supported for movement between a door latched and a door unlatched position, a lock member for locking said door control mechanism supported for movement between an unlocked position, a preset position, and a locked position, spring means for moving said lock member from its preset position into its locked position, an outside operating member supported for movement between a normal non-operating position, a latch member releasing position, and a lock member presetting position, operating connections between said outside operating member and said lock member for moving said lock member from unlocked position into preset position upon movement of said outside operating member from said latch member releasing position to said lock member presetting position, spring means for resisting movement of said outside operating member from said normal non-operating position to said latch member releasing position, and means for imposing additional resistance to movement of said outside operating member during at least the initial portion of its travel between said latch member releasing position and said lock member presetting position.

24. Door control mechanism including latch means for holding a door in closed position, an outside latch means operating member supported for sequential movement in one direction from a normal non-operating position to a latch means releasing position to a locking position, connecting means between said outside latch means operating member and said latch means whereby movement of said outside latch means operating member from said normal non-operating position to said latch means releasing position will release said latch means to permit opening of said door, lock means adapted when in locked position to prevent actuation of said latch means by said outside latch means operating member to permit opening of the door, and means operable by movement of said outside latch means operating member in latch releasing direction from said latch means releasing position to said locking position for moving said lock means toward said locked position.

ANGELO R. DE VITO.

References Cited in the file of this patent

UNITED STATES PATENTS

| Number | Name | Date |
|---|---|---|
| 2,189,992 | Pearce | Feb. 13, 1940 |
| 2,195,195 | Wartian | Mar. 26, 1940 |
| 2,234,810 | Simpson | Mar. 11, 1941 |
| 2,336,211 | Barnes | Dec. 7, 1943 |
| 2,480,688 | Allen | Aug. 30, 1949 |